(12) United States Patent
Tom (10) Patent No.: US 8,407,597 B1
(45) Date of Patent: Mar. 26, 2013

(54) EVENT-BASED USER INTERFACE CUSTOMIZATION

(75) Inventor: Darren Christopher Tom, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 434 days.

(21) Appl. No.: 12/580,599

(22) Filed: Oct. 16, 2009

(51) Int. Cl.
*G06F 15/177* (2006.01)

(52) U.S. Cl. ........ 715/736; 715/734; 715/735; 715/737; 715/740; 715/762; 715/765

(58) Field of Classification Search .................. 715/762, 715/765, 734, 735, 736, 737, 740
See application file for complete search history.

(56) References Cited

U.S. PATENT DOCUMENTS

| | | | | |
|---|---|---|---|---|
| 5,339,392 A | * | 8/1994 | Risberg et al. | 715/762 |
| 5,999,179 A | * | 12/1999 | Kekic et al. | 715/734 |
| 6,628,304 B2 | * | 9/2003 | Mitchell et al. | 715/734 |

* cited by examiner

*Primary Examiner* — Andrey Belousov
(74) *Attorney, Agent, or Firm* — Harrity & Harrity, LLP (57) ABSTRACT

A computing device receives a setting of a customizable preference for an interface element of a user interface and receives a definition for an event associated with the setting. The computing device monitors for an occurrence of the event and receives an indication of the occurrence of the event. The computing device also obtains the setting associated with the event, applies the setting to the interface element, and renders, for presentation on a display, the interface element based on the setting.

19 Claims, 9 Drawing Sheets

| PREFERENCE IDENTIFIER ⟋550 | BACKGROUND IMAGE ⟋560 | VIDEO PLAYER ⟋570 | TITLE FONT ⟋580 | OTHER INTERFACE ELEMENT SETTING(S) ⟋590 |
|---|---|---|---|---|
| DEFAULT SETTING | NONE | WPLAYER.EXE | TIMES 14PT. | |
| EVENT1 SETTING | LOGO-Q.JPG | QCKTM.EXE | ARIAL 12PT. | |
| EVENT2 SETTING | LOGO-P.JPG | DEFAULT | GOUDY 12PT. | |
| ⋯ | | | | |
| EVENT N SETTING | WATERMK.JPG | REEL.EXE | COMIC 14PT. | |

595 braces the last four columns.
540 labels the whole table.

EVENT-BASED USER INTERFACE CUSTOMIZATION

BACKGROUND

Complex management systems may need to convey large amounts of information to different personnel at different times. Some management systems allow customization of screens in a static manner. For example, an administrator may set up an interface screen in a one-screen-fits-all layout. Typically, all required information is presented to users at all times. Thus, a user may be required to view densely populated screens that have more information than may be needed at a particular time. Alternatively, information may be distributed among multiple display windows, requiring a user to switch to an appropriate window to view particular information when needed.

SUMMARY

According to one aspect, a method, implemented by one or more computing devices within a group of computing devices, is provided. The method may include receiving, by one of the one or more computing devices, a setting of a customizable preference for an interface element of a user interface; receiving, by one of the one or more computing devices, a definition for an event associated with the setting; monitoring, by one of the one or more computing devices, for an occurrence of the event; receiving, by one of the one or more computing devices, an indication of the occurrence of the event; obtaining, by one of the one or more computing devices, the setting associated with the event; applying, by one of the one or more computing devices, the setting to the interface element; and rendering, by one of the one or more computing devices and for presentation on a display, the interface element based on the setting.

According to another aspect, a device may include a memory to store instructions and a processor to execute the instructions in the memory. The processor may execute the instructions in the memory to store an event/setting pair for a customizable preference of an interface element of a user interface, where the event/setting pair includes a definition of an event and a setting for the customizable preference based on the event; receive an indication of an occurrence of the event; retrieve the setting for the customizable preference; apply the setting to the interface element; and render, for presentation on a display, the interface element based on the setting.

According to a further aspect, a computer-readable medium containing instructions executable by at least one processor may include one or more instructions to receive a setting for a customizable preference for an interface element of a user interface; one or more instructions to receive a definition for an event associated with the setting; one or more instructions to receive an indication of the occurrence of the event; one or more instructions to apply the setting to the interface element based on the occurrence of the event; and one or more instructions to render, for presentation on a display, the interface element based on the setting.

According to yet another aspect, a device may include means for storing a first setting and a second setting for a customizable preference for an interface element of a user interface; means for storing a definition for a first event associated with the first setting and a definition for a second event associated with a second setting; means for monitoring for an occurrence of the first event or an occurrence of the second event; means for receiving an indication of the occurrence of the first event; means for associating the first setting with the first event in response to the occurrence of the first event; means for applying the first setting to the interface element upon associating the first setting with the first event; means for rendering the interface element based on the first setting; means for receiving an indication of the occurrence of the second event in response to the occurrence of the second event; means for associating the second setting with the second event upon associating the second setting with the second event; means for applying the second setting to the interface element; and means for rendering the interface element based on the second setting.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

As used herein, the term "event" may refer to a programmatically detectable occurrence. For example, an event may include a change to/from a defined time period, a change in network behavior (e.g., an outage, performance drop, adding/removing devices, configuration change, etc.), or a change in external conditions (e.g., temperatures, weather, etc.).

As used herein, the term "user interface" may refer to a graphical user interface (GUI), a command line interface (CLI), a text user interface (TUI), or another interface that enables a user to interact with, for example, a computer operating system. An "interface element," as the term is used herein, may refer to an item within the user interface that relates to performing a specific business task. Exemplary interface elements may include control panels, real-time monitors, dialogs, callouts, buttons, menus, CLI prompts, and/or invocation of third-party systems/devices. A "setting" for an interface element may include, for example, skins (e.g., colors, patterns, texture, shapes, logos, etc.), component position/size, text font/size/position/color, icons, sound effects, data queries, sorting orders, column width/row height for tables, stacking orders, graphs, computed summaries for one or more data sources, and/or jumping to a page (e.g., a web page or another interface page within an application).

Implementations of systems and/or methods may provide event-driven customization for a user interface. Customizable settings for interface elements may take effect when an event occurs. Thus, an administrator may configure automatic changes to the entire look and feel and/or workflows based on time and/or other events. In an exemplary implementation, a network management interface may be configured to adapt to an operational schedule and provide status and control items most relevant for a current situation.

Figure 1:
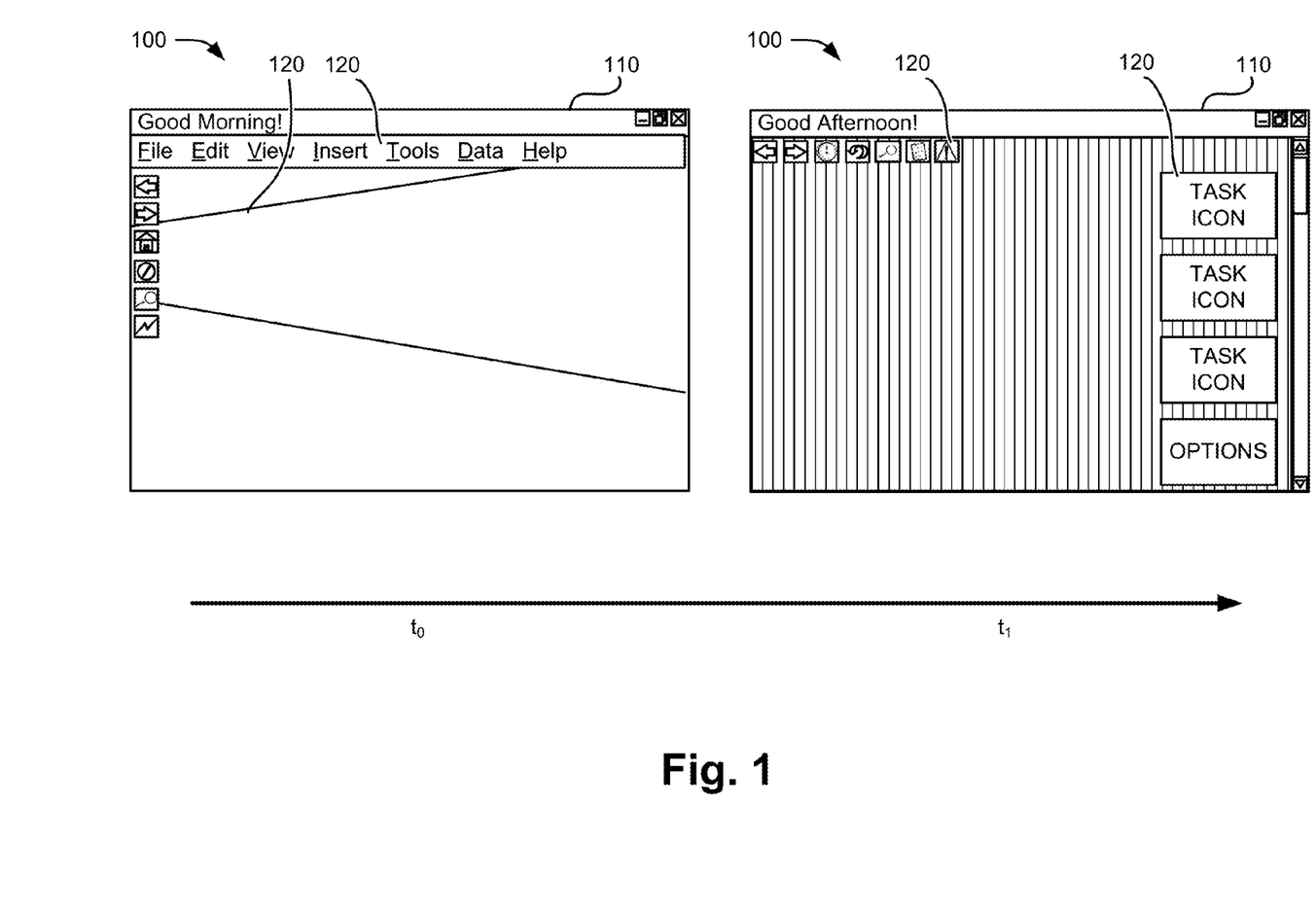
FIG. 1 is a diagram illustrating an overview of an exemplary implementation described herein.

FIG. 1 is a diagram illustrating an overview of an exemplary implementation described herein. More particularly, FIG. 1 shows an exemplary presentation of a user interface as a function of time. As shown in FIG. 1, a display 100 may include a user interface 110 for, for example, a network management application. User interface 110 may include one or more interface elements 120 (referred to herein collectively as "interface elements 120" and generically as "interface element 120"). User interface 110 may present a variety of interface elements 120, such as graphical indicators (or icons) for particular tasks, menus, background images/colors, default displays, etc., with customizable preferences.

In implementations described herein, a user may access an application having user interface 110 at a particular time, $t_0$. For example, a user may log into a particular account or otherwise access an application. The application may reside locally on a device associated with display 100 or may be retrieved from another device (e.g., a server) via a network connection. User interface 110 may include one or more customizable interface elements 120. At time $t_0$, customizable interface elements 120 may be presented according to a first set of custom settings. For example, the background, arrangement of icons, and/or menu arrangements of user interface 110 may be presented in a particular manner corresponding to time $t_0$ in FIG. 1.

The user may again access the application having user interface 110 at a different time, $t_1$. Time $t_1$ may correspond to a point in time after an event (e.g., an event distinguishable from time $t_0$) has occurred. A second set of custom settings, different than the first set of custom settings, for interface elements 120 may be applied when the event occurs. Thus, at time $t_1$, customable interface elements 120 may be presented according to the second set of custom settings. For example, the background, arrangement of icons, and/or menu arrangements of user interface 110 may be presented in a particular manner corresponding to time $t_1$ in FIG. 1.

Exemplary Environment

Figure 2:
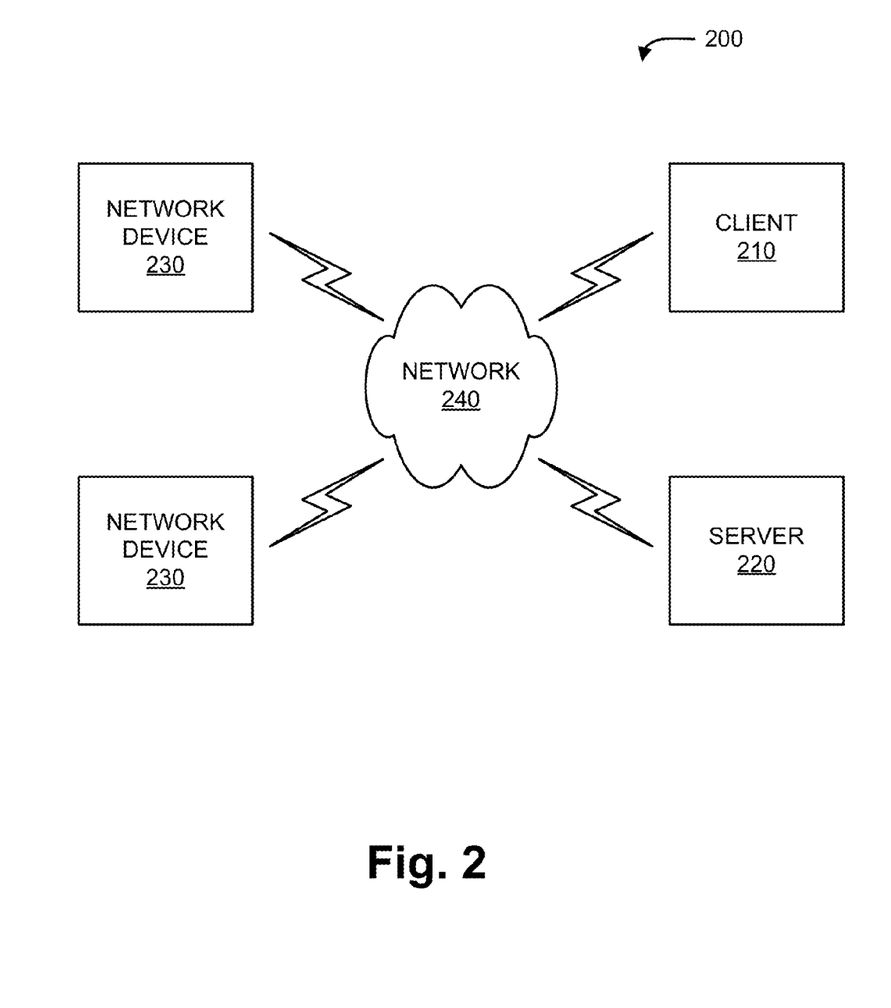
FIG. 2 is a diagram of an exemplary environment in which systems and methods described herein may be implemented.

FIG. 2 is a diagram of an exemplary environment 200 in which systems and methods described herein may be implemented. Environment 200 may include a client 210 connected to a server 220 and/or network devices 230 via a network 240. In FIG. 2, one client 210, one server 220, and two network devices 230 have been illustrated as connected to network 240 for simplicity. In practice, there may be more or fewer clients, servers, and/or network devices. Also, in some instances, one of client 210, server 220, or network device 230 may perform a function of another one of client 210, server 220, or network device 230.

Client 210 may include client entities. An entity may be defined as a device (e.g., a personal computer, a wireless telephone, a personal digital assistant (PDA), a lap top, or another type of computation or communication device), a thread or process running on one of these devices, and/or an object executed by one of these devices. In one implementation, client 210 may include a browser application or another application interface that permits client 210 to retrieve information from server 220 and/or network devices 230. In an exemplary implementation, client 210 may retrieve, from server 220, an application that includes an event-based user interface according to implementations described herein.

Server 220 may include a server entity that gathers, processes, searches, and/or maintains data in a manner described herein. In one implementation, server 220 may gather, process, and/or maintain data that is associated with events and settings for customizable interface elements (e.g., interface elements 120) for a user interface. Server 220 may also include an application, such as a web-based application, that may be accessed by client 210 to exchange information with and perform tasks related to, for example, network devices 230 and/or server 220. As described further herein, the application may include event-driven customization of a user interface for the application.

Network device 230 may include a computing device (such a server device or client device) or a data transfer device (such as a gateway, a router, a switch, a firewall, a network interface card (NIC), a hub, a bridge, a proxy server, an optical add-drop multiplexer (OADM), or some other type of device that processes and/or transfers traffic). In implementations described herein, network devices 230 may provide information to and receive information/instructions from server 220 and/or client 210. Network devices 230 may include one or more components that monitor for events within environment 200.

Network 240 may include any type of network, such as a local area network (LAN), a wide area network (WAN), a telephone network (e.g., the Public Switched Telephone Network (PSTN) or a cellular network), an intranet, the Internet, or a combination of networks. Client 210, server 220, and network devices 230 may connect to network 240 via wired and/or wireless connections.

Exemplary Device Components

Figure 3:
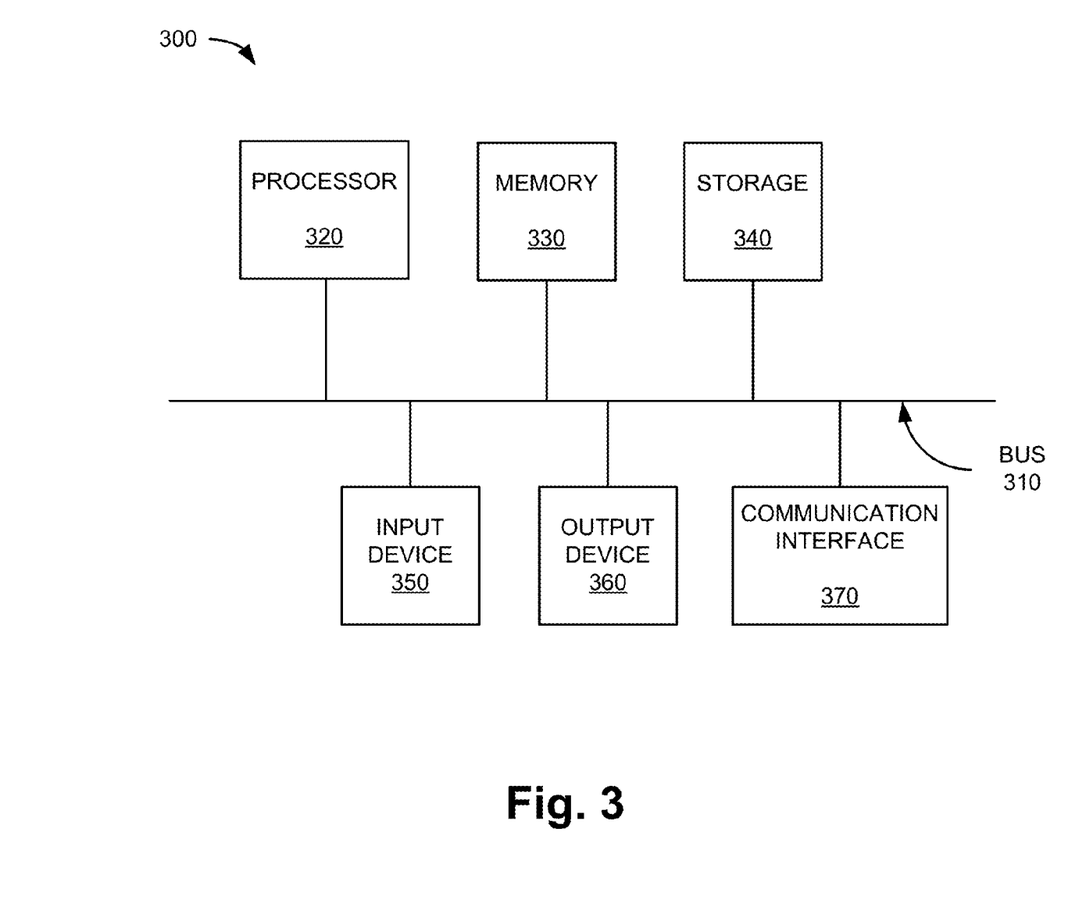
FIG. 3 is a block diagram illustrating exemplary components of a server and/or client of FIG. 2.

FIG. 3 is a diagram illustrating exemplary components of a device 300 that may correspond to client 210, server 220 and/or network device 230 in some implementations. As illustrated, device 300 may include, for example, a bus 310, a processor 320, a memory 330, storage 340, an input device 350, an output device 360, and a communication interface 370.

Bus 310 may permit communication among the other components of device 300. For example, bus 310 may include a system bus, an address bus, a data bus, and/or a control bus. Bus 310 may also include bus drivers, bus arbiters, bus interfaces, and/or clocks.

Processor 320 may include a component to interpret and/or execute instructions and/or data. For example, processor 320 may include a processor, a microprocessor, a data processor, a co-processor, a network processor, an application specific integrated circuit (ASIC), a controller, a programmable logic device, a field programmable gate array (FPGA), or some other processing logic that may interpret and/or execute instructions.

Memory 330 may include a component to store data and/or instructions. For example, memory 330 may include a random access memory (RAM), a dynamic random access memory (DRAM), a static random access memory (SRAM), a synchronous dynamic random access memory (SDRAM), a read only memory (ROM), a programmable read only memory (PROM), an erasable programmable read only memory (EPROM), an electrically erasable programmable read only memory (EEPROM), another type of dynamic or static memory, a cache, and/or a flash memory.

Storage 340 may include a component to store data, instructions, and/or applications. For example, storage 340 may include a hard disk (e.g., a magnetic disk, an optical disk, a magneto-optic disk, etc.), a compact disc (CD), a digital versatile disc (DVD), a floppy disk, a cartridge, a magnetic tape, a flash drive, or another type of computer-readable medium, along with a corresponding drive. A computer-readable medium may be defined as a physical and/or logical memory device. A computer-readable medium may be implemented in a single device, in multiple devices, in a centralized manner, or in a distributed manner.

Input device 350 may include a mechanism that permits an operator to input information to device 300, such as a keyboard, a keypad, a mouse, a pen, voice recognition and/or biometric mechanisms, a touch-screen interface, a port, etc. Output device 360 may include a mechanism that outputs information to the operator, including a display, a speaker, a light emitting diode (LED), a port, or the like.

Communication interface 370 may enable device 300 to communicate with another device, a network, another system, and/or the like. For example, communication interface 370 may include a wireless interface and/or a wired interface, such as an Ethernet interface, an optical interface, etc. Communication interface 370 may include a transceiver.

Device 300 may perform operations and/or processes related to implementing event-based user interface customization. According to an exemplary implementation, device 300 may perform these operations and/or processes in response to processor 320 executing sequences of instructions contained in a computer-readable medium. For example, software instructions may be read into memory 330 from another computer-readable medium, such as storage 340, or from another device via communication interface 370. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 3 illustrates exemplary components of device 300, in other implementations, device 300 may include additional, fewer, different, or differently arranged components than those illustrated in FIG. 3 and described herein. Additionally, or alternatively, one or more operations described as being performed by a particular component of device 300 may be performed by one or more other components, in addition to or instead of the particular component.

Exemplary Functional Components

Figure 4:
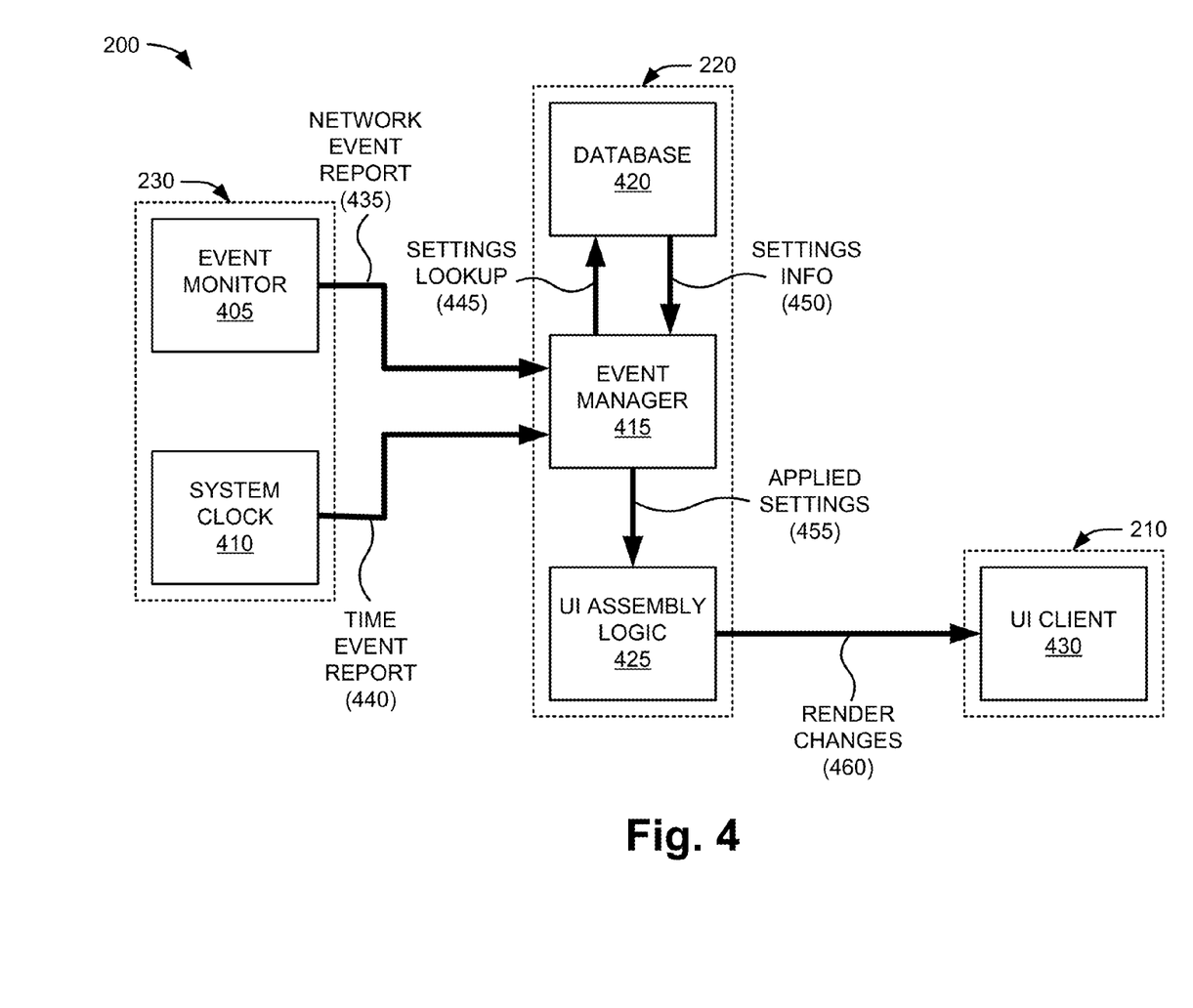
FIG. 4 is a diagram of exemplary functional components of the environment of FIG. 2.

FIG. 4 depicts a diagram of exemplary functional components of environment 200. As shown in FIG. 4, network device 230 may include an event monitor 405 and a system clock 410; server 220 may include an event manager 415, a database 420, and user interface (UI) assembly logic 425; and client 210 may include user interface client 430. In one implementation, the functions described in connection with FIG. 4 may be performed by processor 320 for each of client 210, server 220, and network device 230. While event monitor 405, system clock 410, event manager 415, database 420, user interface assembly logic 425, user interface client 430 are shown in FIG. 4 as associated with a particular client 210, server 220, or network device 230, in other implementations the functional components may be distributed differently among client 210, server 220, or network device 230.

Event monitor 405 may include hardware or a combination of hardware and software that may monitor and/or detect an event. For example, event monitor 405 may receive (e.g., from a network administrator) event criteria and monitor activity within environment 200 for the criteria. Event monitor 405 may identify time-based criteria (e.g., a defined time period), a change in network behavior (e.g., an outage, performance drop, adding/removing devices, configuration change, etc.), a change in external conditions (e.g., temperature ranges/thresholds, etc.), or combinations thereof (e.g., network behavior that occurs during a particular time period).

System clock 410 may include hardware or a combination of hardware and software that may identify a time, such as a time associated with a coordinated universal time (UTC) clock, and may synchronize the time with other devices and/or functional components. For example, system clock 410 may utilize a network clock synchronization protocol (e.g., Network Time Protocol (NTP) and Digital Time Synchronization Protocol (DTSS)) that can read a server clock and transmit the time associated with the server clock to one or more clients to adjust each client clock as required.

Event manager 415 may include hardware or a combination of hardware and software that may receive event indications from event monitor 405 and initiate lookups to retrieve custom settings for a user interfaces associated with the events. Event manager 415 may apply the appropriate settings to customizable interface elements (e.g., interface elements 120) associated with a user interface being accessed, for example, by a client 210.

Database 420 may include a memory or another storage device that may store custom settings associated with particular events. Database 420 may be included within, for example, memory 330 of server 220. Database 420 may include, example, event definitions (e.g., particular times or network conditions constituting an event). Database 420 may also include default settings and customized settings for each interface element.

User interface assembly logic 425 may include hardware or a combination of hardware and software that may render changes to the user interface being accessed, for example, by a client 210. User interface assembly logic 425 may receive settings/definitions for changes to interface elements due to recognition of an event.

User interface client 430 may include hardware or a combination of hardware and software that may receive the rendered changes from user interface assembly logic 425 and may present the changes within the user interface presented to the user of, for example, client 210.

In operation, functional components of FIG. 4, may map desired events to specific settings for an interface element and apply the specific settings to an active user interface (e.g., user interface 110). Event monitor 405 may identify occurrence of an event and provide a network event report 435 to event manager 415. Network event report 435 may provide an indication of an event or a partial indication of an event. For example, event report 435 may include information regarding network behavior. The network behavior may be sufficient to define an event or the network behavior may be combined with other information, such as time, to define an event. In one implementation event monitor 405 may communicate with system clock 410 to define a time-based network event. Additionally and/or alternatively, system clock 410 may provide time event report 440 to event manager 415. In one implementation, time event report 440 may include an indication of a time-based event, such as an independent time event. For example, system clock 410 may provide an indication of the start of a defined time period.

Event manager 415 may receive network event report 435 and/or time event report 440 and, in response, initiate settings lookup 445. Settings lookup 445 may request, from database 420, settings associated with the event for the interface element (interface element 120). In response, database 420 may provide settings information 450 to event manager 415. Event manager 415 may apply settings information 450 to the interface elements as applied settings 455. Applied settings 455 may be provided as instructions to user interface assembly logic 425. User interface assembly logic 425 may render the stored interface element settings associated with the event(s) received in network event report 435 and/or time event report 440. The rendered changes 460 may then be provided to user interface client 430.

Although FIG. 4 shows exemplary functional components of environment 200, in other implementations, environment 200 may contain fewer, different, differently arranged, or additional functional components than depicted in FIG. 4. In still other implementations, one or more functional components of environment 200 may perform one or more other tasks described as being performed by one or more other functional components of environment 200.

Exemplary Database Portions

Figure 5A:
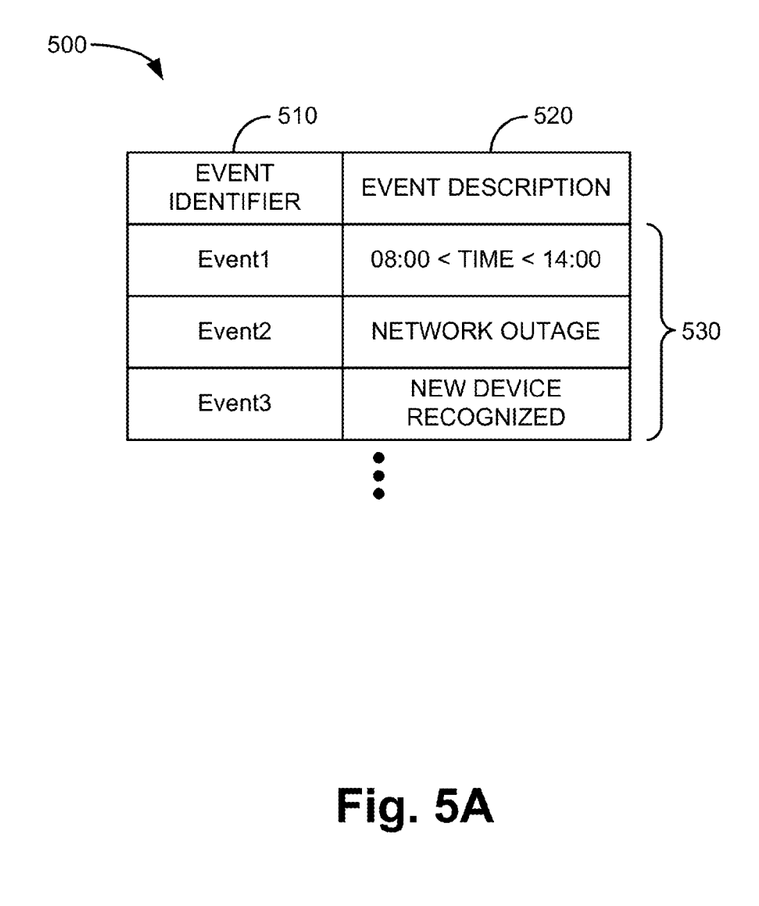
FIGS. 5A and 5B illustrates a diagram of an exemplary portion of a database depicted in FIG. 4.

FIG. 5A illustrates a diagram of an exemplary portion 500 of database 420. As shown, database portion 500 may include an event identifier field 510, an event description field 520, and/or a variety of entries 530 associated with fields 510-520.

Event identifier field 510 may include a unique identifier for an event being defined by a user. An event identifier may include a textual description, an alpha-numeric character combination, or another identification label for an event. For example, as shown in FIG. 5A, event identifier field 510 may include an event identifier associated with a first event (e.g., "Event1"), a second event (e.g., "Event2"), and a third event (e.g., "Event3").

Event description field 520 may include a definition for an event defined by a user. In one implementation, an event may be defined by a time (e.g., one time or a recurring time period). In the case of a time range, an endpoint of the range may be automatically associated with a setting in effect before the time range became effective. In another implementation, an event may be defined as a detectible network condition or a detectable network condition in combination with a particular time. Event description field 520 may be defined in terms of particular devices (e.g., network devices 230, server 220, etc.), fields of particular network communication protocols, etc. For example, as shown in FIG. 5A, event description field 520 may include an event description associated with a first event (e.g., "08:00<Time<14:00"), an event description associated with a second event (e.g., "Network Outage"), and an event description associated with a third event (e.g., "New Device Recognized").

Figure 5B:
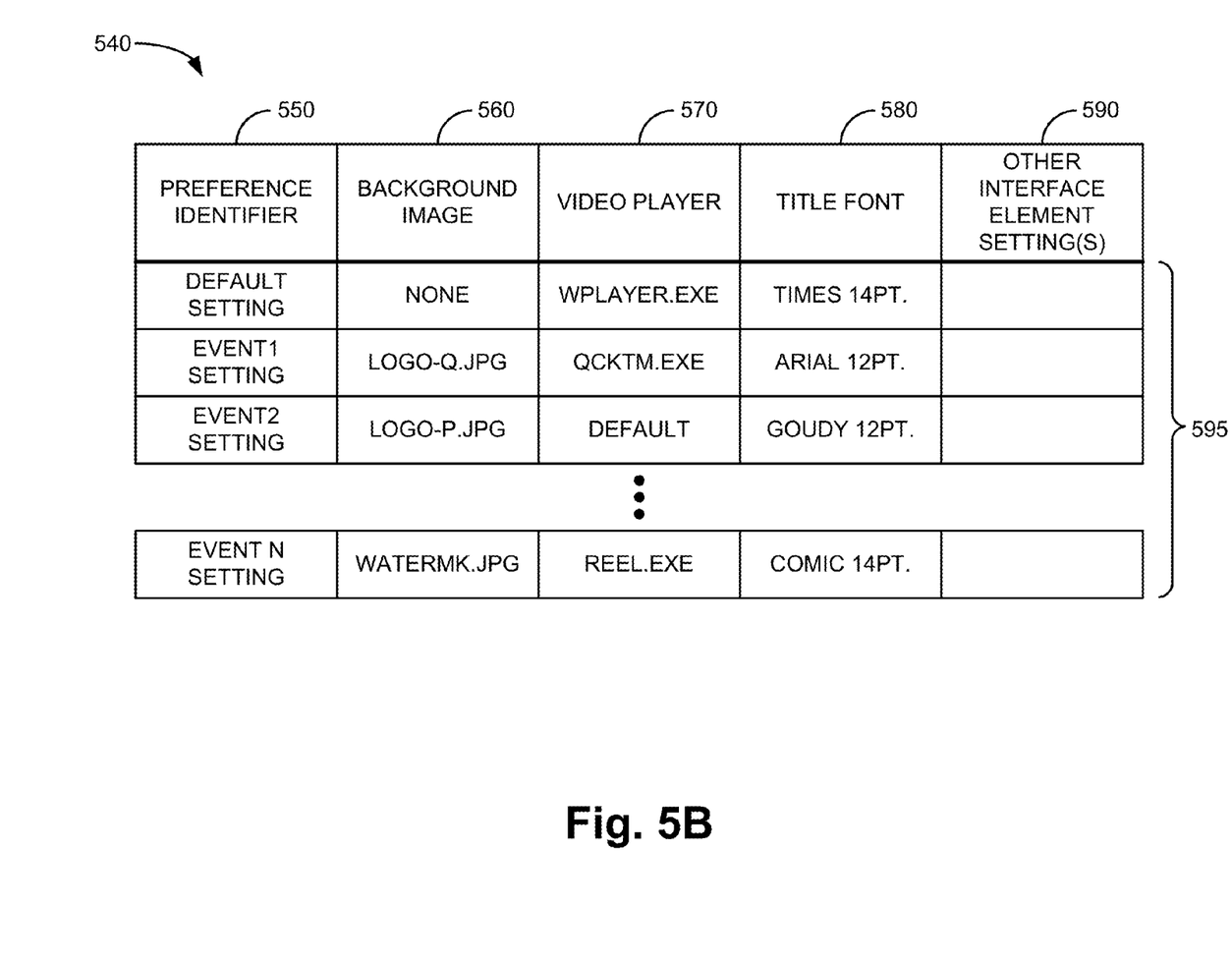

FIG. 5B illustrates a diagram of another exemplary portion 540 of database 420. As shown, database portion 540 may include a preference identifier field 550, one or more interface element setting fields 560, 570, 580, 590, and/or a variety of entries 595 associated with fields 550-590.

Preference identifier field 550 may include an indication of default or event settings being defined by a user. Preference identifier field 550 may include a field to cross-reference an event identifier with settings associated with the event. For example, as shown in FIG. 5B, preference identifier field 550 may include a setting identifier associated with a default (e.g., "default setting"), a first event (e.g., "Event1 Setting"), a second event (e.g., "Event2 Setting"), and an "N" event (e.g., "Event N Setting").

Interface element setting field 560 may include preference settings for an interface element defined by a user. Each interface element may have a default preference and up to "N" event preferences. For example, as shown in FIG. 5B, interface element setting field 560 may include settings for a background image associated with a default setting (e.g., "None"), an event1 setting (e.g., "logo-q.jpg"), an event2 setting (e.g., "logo-p.jpg"), and an event "N" setting (e.g., "watermk.jpg"). Similarly, interface element setting fields 570, 580, and 590 may include settings for other customizable interface elements and associations with particular events.

Although FIGS. 5A and 5B show exemplary information that may be provided in database portions 500 and 540, in other implementations, database portions 500 and 540 may contain less, different, differently arranged, or additional information than depicted in FIGS. 5A and 5B. For example, although database portions 500 and 540 are shown separately in FIGS. 5A and 5B, in other implementations database portions 500 and 540 may be combined.

Exemplary Process

Figure 6:
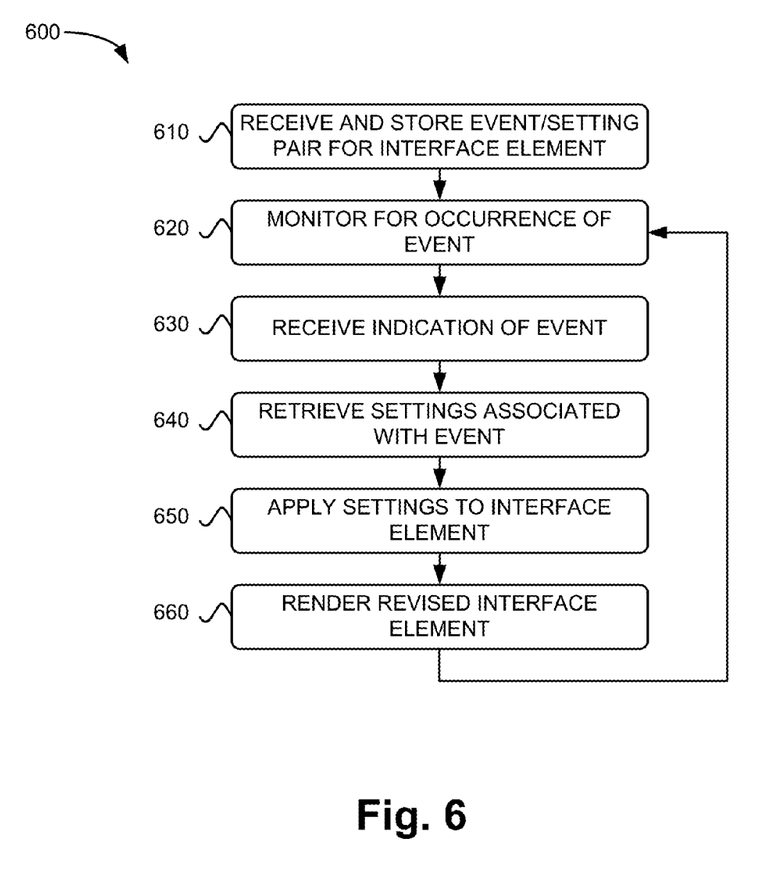
FIG. 6 illustrates a flow chart of an exemplary process for implementing event-based user interface customization according to implementations described herein.

FIG. 6 illustrates a flow chart of an exemplary process 600 for implementing event-based user interface customization according to implementations described herein. In one implementation, process 600 may be performed by server 220. In another implementation, some or all of process 600 may be performed by another device or a group of devices, such as client 210 and/or network device 230, in conjunction with server 220.

As illustrated in FIG. 6, process 600 may include receiving and storing an event/setting pair for an interface element (block 610). For example, a user may specify an event, such as a time event or a network event that may serve as a trigger for a customizable interface element. The user may also specify a custom setting value that will be applied to the interface element when the event is triggered. The event/setting pair for the interface element may be stored in a memory (e.g., database 420).

Occurrence of an event may be monitored (block 620) and an indication of an event may be received (block 630). For example, in implementations described above in connection with FIG. 4, event monitor 405 may identify an occurrence of an event and provide a network event report 435 to event manager 415 (e.g., within server 220). Network event report 435 may provide an indication of an event or a partial indication of an event. For example, event report may include information regarding network behavior. The network behavior may be sufficient to define an event or the network behavior may be combined with other information, such as time, to define an event. In one implementation event monitor 405 may communicate with system clock 410 to define a time-based network event. Additionally and/or alternatively, system clock 410 may provide time event report 440 to event manager 415. In one implementation, time event report 440 may include an indication of a time-based event, such as an independent time event. For example, system clock may provide an indication of the start of a defined time period.

Returning to FIG. 6, settings associated with the event may be retrieved (block 640), the settings may be applied to an interface element associated with the event (block 650), and a revised interface element may be rendered (block 660). For example, in implementations described above in connection with FIG. 4, event manager 415 may receive network event report 435 and/or time event report 440 and, in response, initiate settings lookup 445. Settings lookup 445 may, request from database 420, settings associated with the event for the interface element (interface element 120). In response database 420, may provide settings information 450 to event manager 415. Event manager 415 may apply settings information 450 to the interface elements as applied settings 455. Applied settings 455 may be provided as instructions to user interface assembly logic 425. User interface assembly logic 425 may render the stored interface element settings associated with the event(s) identfied in network event report 435 and/or time event report 440. The rendered changes 460 may then be provided to user interface client 430.

After the revised interface element is rendered, process 600 may return to block 620 to continue to monitor for occurrence of another network event that may trigger additional changes to the user interface.

EXAMPLES

Figure 7:
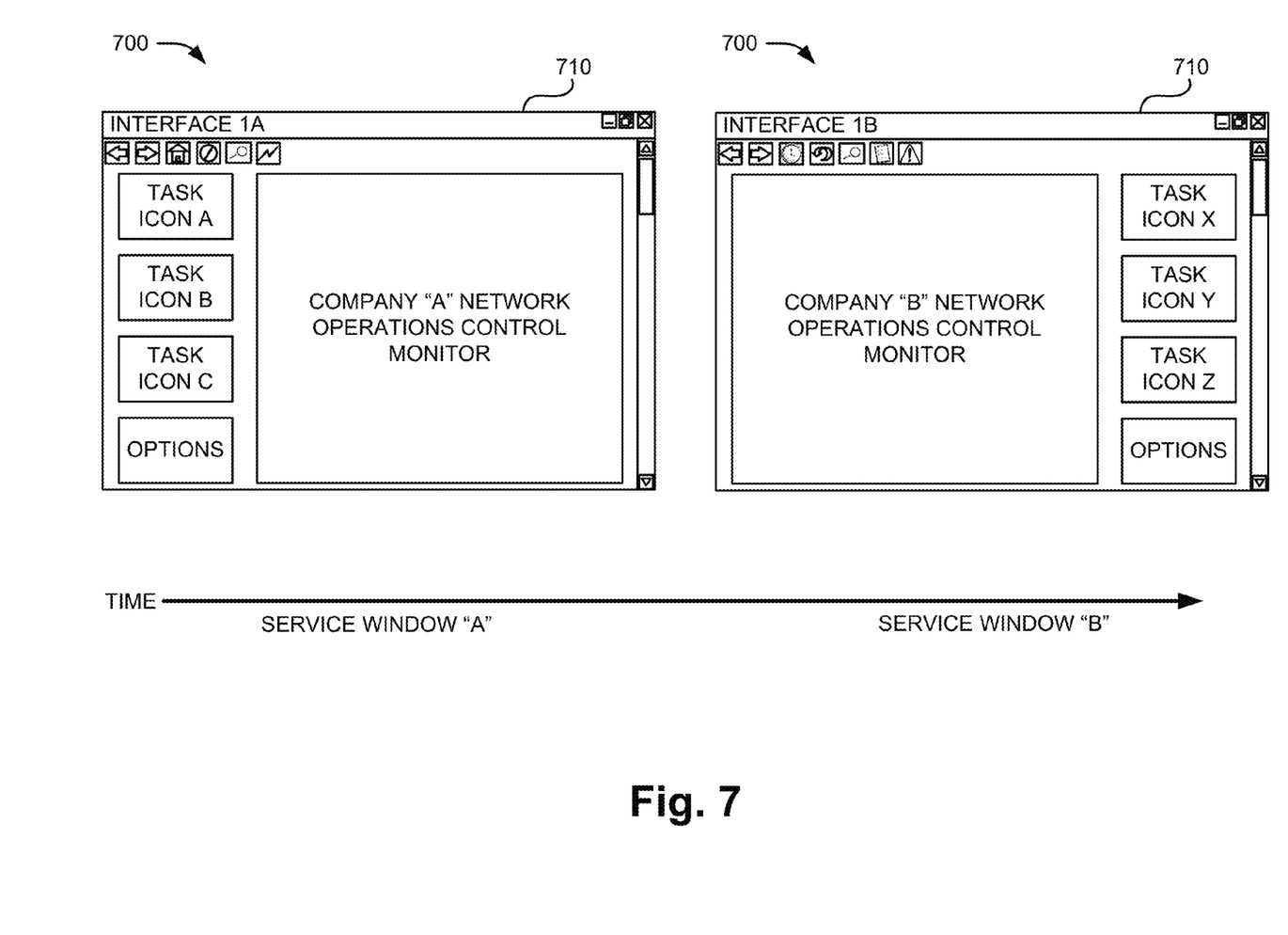
FIGS. 7 and 8 are diagrams of exemplary implementations of event-based user interface customization.

FIG. 7 provides a display 700 of an exemplary implementation of event-based user interface customization. In the implementation of FIG. 7, a user interface 710 may be included within a network application platform. User interface 710 may include customizable interface elements with preferences that may change based on the occurrence of events. As shown in FIG. 7, user interface window 710 may have one configuration during a time period shown as "service window 'A'" and another configuration during a time period shown as "service window 'B.'"

Assume, for example, that a service provider using user interface 710 is responsible for the networks of two different companies and that each company is in a different time zone. Using event-based GUI preferences, an interface element, such as a network operations control (NOC) monitor dashboard may be set so that a network update panel displaying the changes to a given network appears only when a specified service window (e.g., service window "A" or service window "B") opens for each company. In the NOC monitor, the operator may see the network status of the company (e.g., company "A" or company "B") whose service window is open, without touching a keyboard or mouse. Thus, it would not be necessary to have both companies' NOC monitor open at the same time or to manually switch between them. The event-based user interface customization may reduce the visual complexity and the possibility of operator error, since only the relevant information is shown.

Furthermore, in another exemplary implementation, the preferences for a time period (e.g., "service window 'A'") may block network changes from happening outside the time period (e.g., during "service window 'B'"). Additionally and/or alternatively, an event-based preference for user interface 710 could be set to display the relevant NOC monitor and/or job status if an update is performed outside of an expected time (e.g., an update for company "A" that is performed during "service window 'B'") to bring immediate attention to the unexpected event.

Although FIG. 7 shows an exemplary arrangement of display 700, in other implementations, display 700 may contain fewer, different, differently arranged, or additional elements than depicted in FIG. 7.

Figure 8:
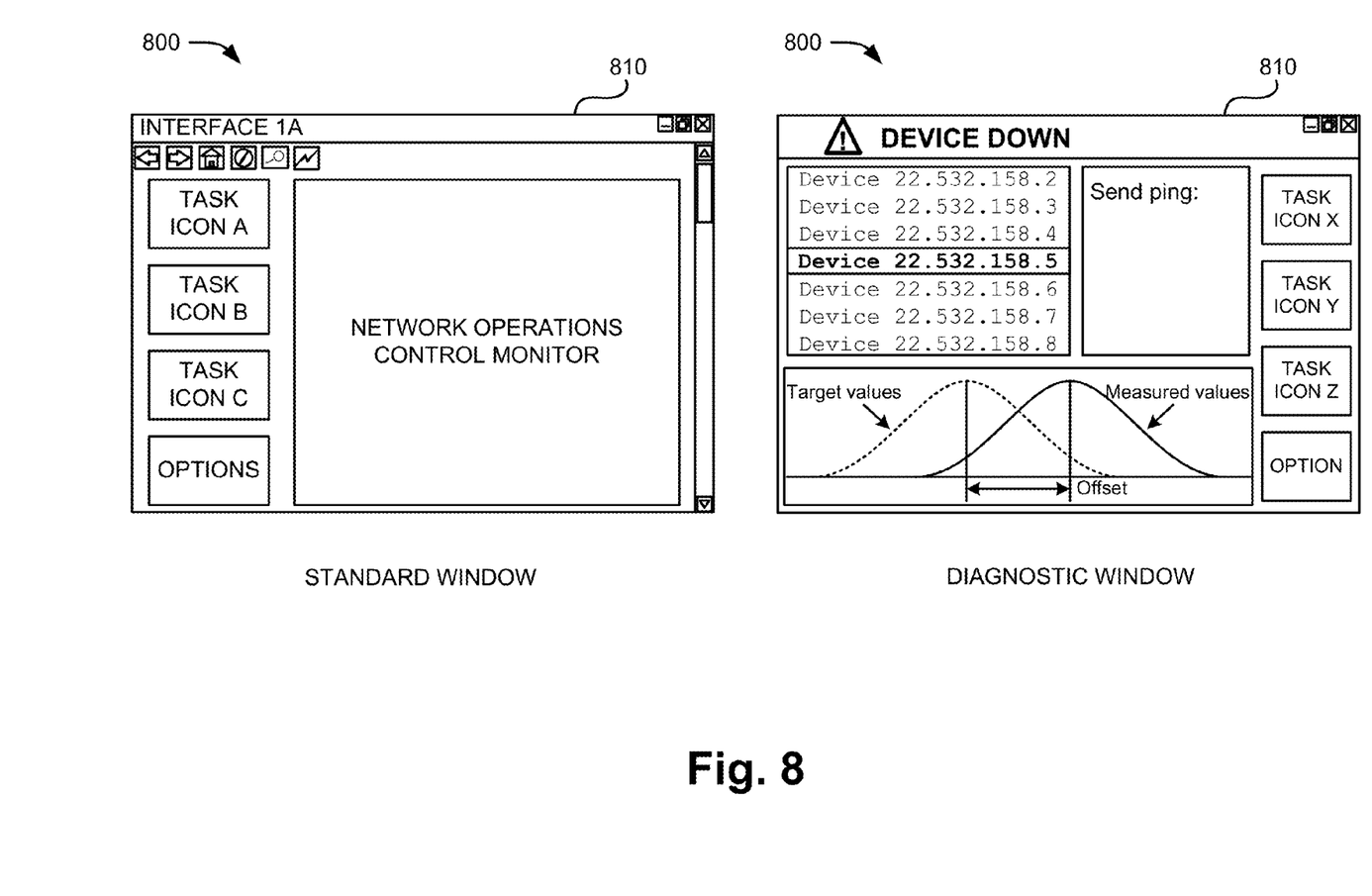

FIG. 8 provides a display 800 of another exemplary implementation of event-based user interface customization. In the implementation of FIG. 8, a user interface 810 may be included within a network application platform. User interface 810 may include customizable interface elements with preferences that may change based on the occurrence of events. As shown in FIG. 8, display 800 may present standard preferences for user interface 810 that may include a default presentation during normal network operations and a diagnostic preferences for user interface 810 that may be present when a particular network event occurs, such as an unscheduled shutdown of a device.

A service provider using user interface 810 may be responsible for a particular network. Using event-based GUI preferences, an interface element, such as a NOC monitor dashboard may be set so that a network update panel displaying basic monitoring information for the network may appear during normal operations.

A reporting of a network event (e.g., an automated failure report by a network device or a manually-entered failure report) may trigger display 800 to switch to diagnostic preferences for user interface 810. Diagnostic preferences for user interface 810 may include preferences for interface elements that enable a user to respond to the network event (e.g., failure of a network device). For example, diagnostic preferences for user interface 810 may present forensic/diagnostic tools that may allow a user to quickly identify affected devices, customers, and/or performance issues.

Although FIG. 8 shows an exemplary arrangement of display 800, in other implementations, display 800 may contain fewer, different, differently arranged, or additional elements than depicted in FIG. 8

CONCLUSION

Systems and/or methods described herein receive a setting for a customizable preference for an interface element of a user interface and may receive a definition for an event associated with the setting. The systems and/or methods may monitor for an occurrence of the event and may receive an indication of the occurrence of the event. The systems and/or methods also may obtain the setting associated with the event, may apply the setting to the interface element, and may render, for presentation on a display, the interface element based on the setting.

Implementations described herein may reduce information overload for operators of a user interface by automatically keeping a display relevant to current tasks. Implementations described herein may also reduce the risk of operator confusion and errors. Implementations described herein may further improve use of an available display area so that essential detailed information may be presented to an operator. Thus, implementations described herein may provide improved integration of network management tools into a business process.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 5, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by one or more computing devices, a setting for an interface element of a user interface,
      the setting including information for displaying first information in the interface element when an event occurs, and
      the first information including first graphical indicators for performing one or more first tasks that are used to manage one or more first devices of a first network;
   receiving, by the one or more computing devices, a definition for the event,
      the event including a change in network behavior of the first network;
   providing for display, by the one or more computing devices, second information in the interface element,
      the second information including second graphical indicators for performing one or more second tasks that are used to manage one or more second devices of a second network, and
      the second network being different from the first network;
   receiving, by the one or more computing devices, an indication of an occurrence of the event;
   obtaining, by the one or more computing devices, the setting associated with the event;
   providing for display, by the one or more computing devices and based on the setting, the first information in the interface element after receiving the indication of the occurrence of the event;
   receiving, by the one or more computing devices, an indication of a termination of the event;
   obtaining, by the one or more computing devices, a default setting associated with the interface element; and
   providing for display, by the one or more computing devices and based on the default setting, the second information in the interface element after receiving the indication of the termination of the event.

2. The method of claim 1, where the event further includes the change in network behavior during a particular time period.

3. The method of claim 1, where providing for display the first information in the interface element includes:
   presenting, on a display associated with the one or more computing devices, the first information in the interface element based on the setting.

4. The method of claim 1, further comprising:
   storing, in a memory associated with the one or more computing devices, the setting for the interface element of the user interface, the definition for the event associated with the setting, other settings for other interface elements of the user interface, and other definitions for other events associated with the other settings.

5. The method of claim 1, where the interface element includes one or more of:
   a control panel,
   a monitoring display,
   a dialog box,
   a callout,
   a button,
   a menu,
   a command line interface (CLI) prompt, or
   an invocation of an external program.

6. The method of claim 1, where the user interface is:
   a graphical user interface (GUI),
   a command line interface (CLI), or
   a text user interface (TUI).

7. The method of claim 1, where the definition of the event includes a time period for a service window of the first network being serviced by a user of the one or more computing devices.

8. A computing device comprising:
   a processor to:
      store a setting for an interface element of a user interface,
         the setting including information for displaying first information in the interface element when an event occurs,
         the first information including first graphical indicators for performing one or more first tasks that are used to manage one or more first devices of a first network, and
         the event including a change in network behavior of the first network;
      provide for display second information in the interface element,
         the second information including second graphical indicators for performing one or more second tasks that are used to manage one or more second devices of a second network, and
         the second network being different from the first network;
      receive an indication of an occurrence of the event;
      provide for display, based on the setting, the first information in the interface element after receiving the indication of the occurrence of the event,
      receive an indication of a termination of the event;
      obtain a default setting associated with the interface element; and
      provide for display, based on the default setting, the second information in the interface element after receiving the indication of the termination of the event.

9. The computing device of claim 8, where the processor is further to:
   store a plurality of other settings for at least one of the interface element or other interface elements of the user interface,
      the plurality of other settings being associated with other events;
   identify an occurrence of a particular event of the other events; and
   provide for display the user interface based on a particular setting, of the plurality of other settings, associated with the particular event and after identifying the occurrence of the particular event.

10. The computing device of claim 9, where the processor is further to:
    receive an indication of an occurrence of a different event;
    retrieve a different setting associated with the different event; and
    provide for display, based on the different setting, different information in the interface element.

11. The computing device of claim 8, where the event further includes the change in network behavior during a particular time period.

12. The computing device of claim 8, where the user interface is one or more of:
- a graphical user interface (GUI),
- a command line interface (CLI), or
- a text user interface (TUI).

13. The computing device of claim 8, where the setting further includes information specifying, for the interface element, one or more of:
- a skin,
- a component position,
- a component size,
- a font format,
- an icon selection,
- a sound effect,
- a data query,
- a sorting order, or
- a data source summary.

14. The computing device of claim 8, where, when providing for display the first information in the interface element, the processor is to:
- present, on a display associated with the computing device and based on the setting, the first information in the interface element.

15. A non-transitory computer-readable medium storing instructions, the instructions comprising:
- one or more instructions that, when executed by at least one processor, cause the at least one processor to:
  - receive a setting for an interface element of a user interface,
    - the setting including information for displaying first information in the interface element when an event occurs, and
    - the first information including first graphical indicators for performing one or more first tasks that are used to manage one or more first devices of a first network;
  - receive a definition for the event associated with the setting,
    - the event including a change in network behavior of the first network;
  - provide for display second information in the interface element,
    - the second information including second graphical indicators for performing one or more second tasks that are used to manage one or more second devices of a second network, and
    - the second network being different from the first network;
  - receive an indication of an occurrence of the event;
  - provide for display, based on the setting, the first information in the interface element after receiving the indication of the occurrence of the event;
  - receive an indication of a termination of the event;
  - obtain a default setting associated with the interface element; and
  - provide for display, based on the default setting, the second information in the interface element after receiving the indication of the termination of the event.

16. The non-transitory computer-readable medium of claim 15, the instructions further comprising:
- one or more instructions that, when executed by the at least one processor, cause the at least one processor to:
  - retrieve the setting associated with the event from a memory that stores settings for a plurality of events before displaying the first information in the interface element.

17. A device comprising:
- one or more processors to:
  - store a first setting and a second setting for a user interface,
    - the first setting including information for displaying first information in the user interface when an event occurs,
    - the event including a change in network behavior of a first network,
    - the first information including first graphical indicators for performing one or more first tasks that are used to manage one or more first devices of the first network,
    - the second setting including information for displaying second information in the user interface when the event ends,
    - the second information including second graphical indicators for performing one or more second tasks that are used to manage one or more second devices of a second network, and
    - the second network being different from the first network;
  - determine an occurrence of the event;
  - provide for display, after determining the occurrence of the event and based on the first setting, the first information in the user interface;
  - receive an indication of an end of the event;
  - obtain the second setting; and
  - provide for display, after receiving the indication of the end of the event and based on the second setting, the second information in the user interface.

18. The device of claim 17, where the event includes the change in the network behavior during the particular time period.

19. The non-transitory computer-readable medium of claim 15, the instructions further comprising:
- one or more instructions that, when executed by the at least one processor, cause the at least one processor to:
  - block changes to the first network by a user when the second information is displayed in the interface element.

* * * * *